(12) United States Patent
Farnan

(10) Patent No.: US 9,031,364 B1
(45) Date of Patent: May 12, 2015

(54) FIBER OPTIC CONNECTOR

(71) Applicant: Winchester Electronics Corporation, Wallingford, CT (US)

(72) Inventor: Jerome C. Farnan, Franklin, MA (US)

(73) Assignee: Winchester Electronics Corporation, Wallingford, CT (US)

( * ) Notice: Subject to any disclaimer, the term of this patent is extended or adjusted under 35 U.S.C. 154(b) by 57 days.

(21) Appl. No.: 13/800,589

(22) Filed: Mar. 13, 2013

Related U.S. Application Data

(63) Continuation of application No. 12/699,255, filed on Feb. 3, 2010, now Pat. No. 8,406,583.

(60) Provisional application No. 61/149,568, filed on Feb. 3, 2009.

(51) Int. Cl.
*G02B 6/32* (2006.01)
*G02B 6/42* (2006.01)

(52) U.S. Cl.
CPC ............... *G02B 6/32* (2013.01); *G02B 6/4204* (2013.01)

(58) Field of Classification Search
None
See application file for complete search history.

(56) References Cited

U.S. PATENT DOCUMENTS

| | | | |
|---|---|---|---|
| 3,117,193 A | 1/1964 | Hirshfield et al. | |
| 4,781,431 A | 11/1988 | Wesson et al. | |
| 5,535,294 A | 7/1996 | Kamuz et al. | |
| 5,542,013 A | 7/1996 | Kaplow et al. | |
| 5,642,446 A | 6/1997 | Tsai | |
| 5,828,804 A | 10/1998 | Akins | |
| 5,999,669 A | 12/1999 | Pan et al. | |
| 6,045,378 A | 4/2000 | Follingstad | |
| 6,535,663 B1 | 3/2003 | Chertkow | |
| 7,245,799 B2 | 7/2007 | Shull et al. | |
| 7,371,014 B2 | 5/2008 | Willis et al. | |
| 7,775,725 B2 * | 8/2010 | Grinderslev | 385/74 |
| 2004/0091202 A1 | 5/2004 | Ji et al. | |

OTHER PUBLICATIONS

International Search Report and Written Opinion issued on Jun. 28, 2010 in corresponding International Application No. PCT/US2010/023002, 11 pages.
King's Electronics Co., Inc., "Video Jack Single Circuit", dated Jun. 1, 2004, 1 page.

* cited by examiner

Primary Examiner — Jerry Rahll
(74) Attorney, Agent, or Firm — Rothwell, Figg, Ernst & Manbeck, P.C.

(57) ABSTRACT

The present invention provides a fiber optic jack for routing optical signals. In another aspect, the present invention provides a fiber optic connector with accurate alignment that may be used with, among other things, the fiber optic jack.

8 Claims, 25 Drawing Sheets

FIBER OPTIC CONNECTOR

CROSS-REFERENCE TO RELATED APPLICATIONS

The present application is a continuation of application Ser. No. 12/699,255, filed on Feb. 3, 2010 (status pending), which claims the benefit of U.S. provisional patent application No. 61/149,568, filed on Feb. 3, 2009. The entire contents of the above identified applications are incorporated by reference herein.

BACKGROUND

1. Field of the Invention

The present invention generally relates to apparatuses for optically connecting optical fibers.

2. Related Art

A copper jack is very common and almost universally used in the broadcast industry to manually route electrical signals through a broadcast studio, mobile studio or other area where electrical signals need to be routed. As more and more data is being transmitted using optical signals rather than electrical signals there is a need to produce an optical jack that can be used to route optical signals.

SUMMARY

In one aspect, the present invention provides a fiber optic jack for routing optical signals.

In another aspect, the present invention provides a fiber optic connector with accurate alignment that may be used with, among other things, a fiber optic jack according to embodiments of the invention.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
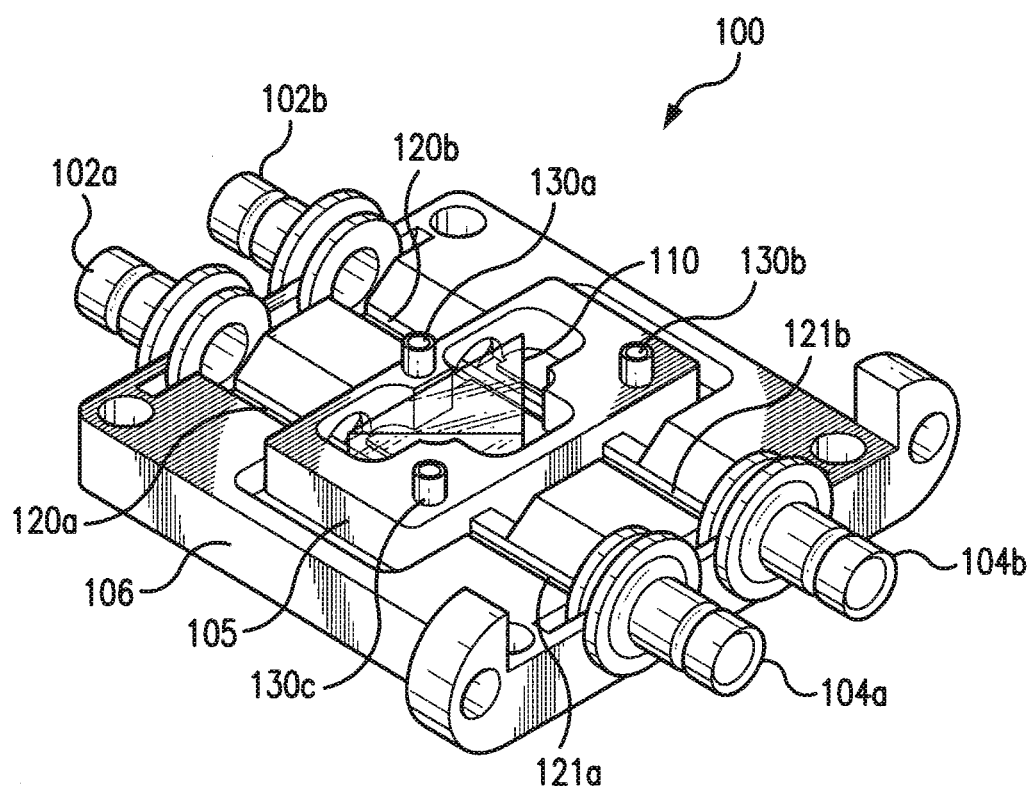
FIGS. 1-8 illustrate a fiber optic jack according to embodiments of the invention.

Referring now to FIG. 1, FIG. 1 illustrates a fiber optic jack 100 according to some embodiments of the invention. In the embodiment shown, jack 100 has four ports (ports 102a,b and 104a,b) (e.g., four connectors). Two on the front and two on the back. Each port is configured to mate with (e.g., receive) a counterpart fiber optic connector. In the embodiment shown, each port is a female connector for mating with a male or hermaphroditic fiber optic connector.

Jack 100 has two modes of operation. A "normal" mode and an "interrupt" mode.

Figure 2:
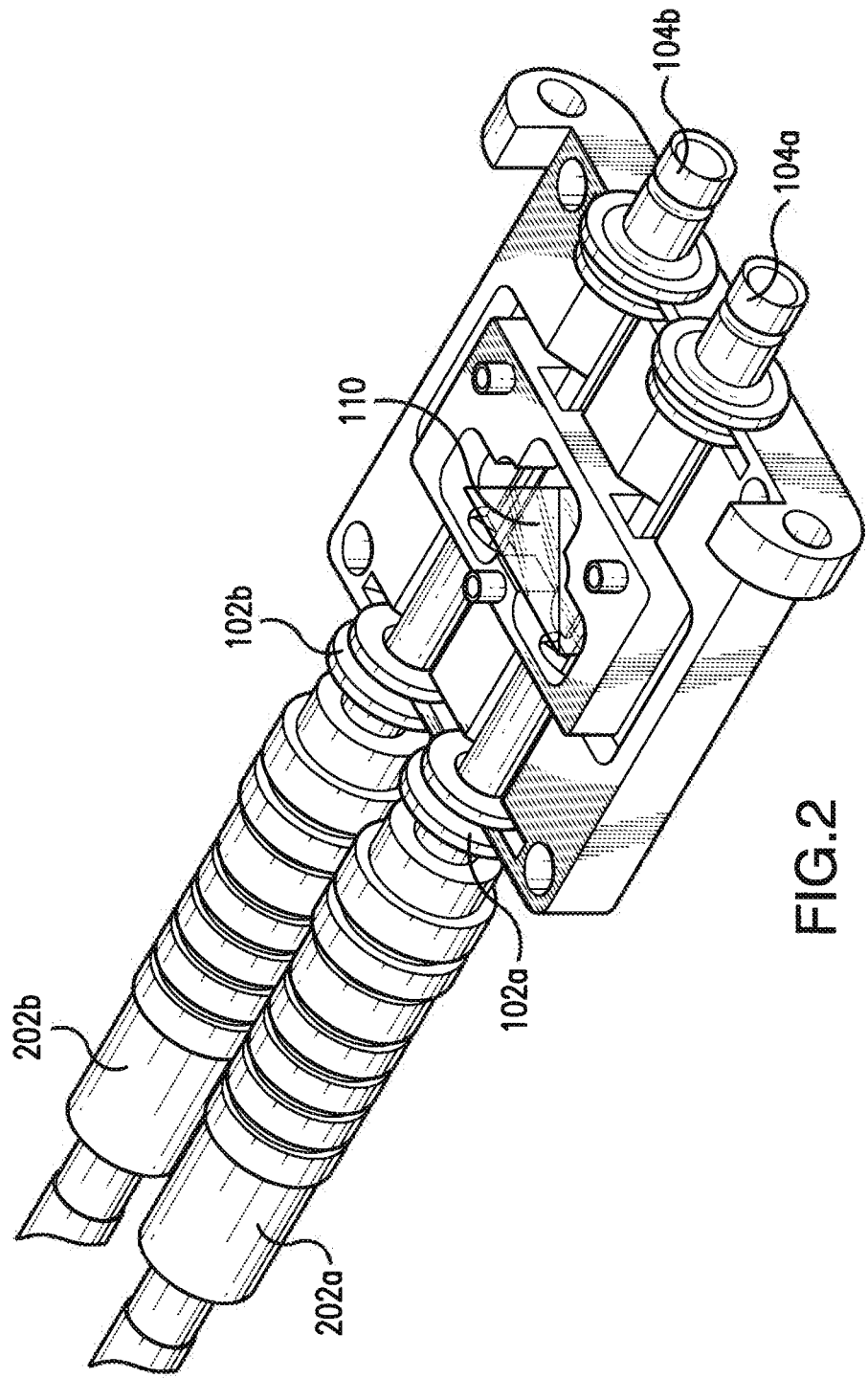

FIG. 2 illustrates jack 100 operating in the normal mode. In the normal mode of operation, a first fiber optic connector 202a is inserted into rear port 102a and a second fiber optic connector 202b is inserted into rear port 102b. In this configuration, jack 100 optically connects connector 202a to connector 202b via, for example, an optical signal reflector 110 (e.g., a prism or other optical signal reflector). Accordingly, the rear ports are the 'normal' connection and would be used to connect an input and an output signal that are connected together under normal operation of the system.

For the sake of illustration, we will assume that connector 202a houses an end of an optical fiber that outputs an optical signal into jack 100. Accordingly, this optical signal is reflected by reflector 110 such that the optical signal is injected into connector 202b. Fiber optic connectors 202a and 202b may be expanded beam connectors.

Figure 3:
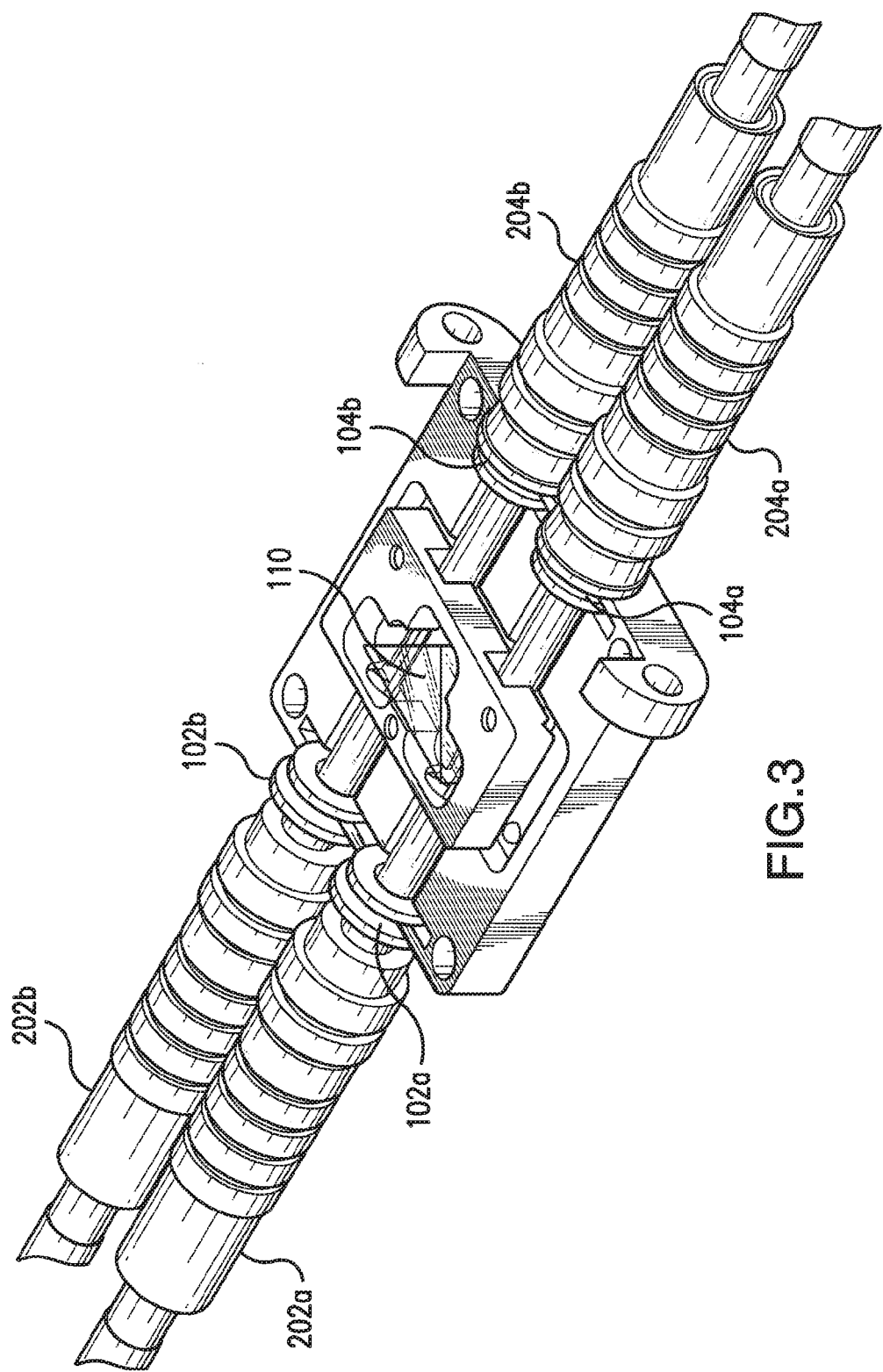

Referring now to FIG. 3, when it is desirable to gain access to this optical signal, a third connector 204a may be plugged into front port 104a of jack 100 causing the optical signal to be injected into connector 204a. For example, in some embodiments, when connector 204a is fully inserted into port 104a an optical path from connector 202a to connector 204a is automatically created so that any optical signal output from connector 202a will be received by connector 204a. Similarly, when a connector 204b is fully inserted into port 104b an optical path from connector 204b to connector 202b is automatically created so that any optical signal output from connector 204b will be received by connector 202b.

This allows insertion of a new signal into the signal path and monitoring of the signal that is present on the rear of the jack by attaching a connector into the front of the jack. For example, if a signal containing an HDTV picture from a camera is carried by the optical fiber connected to connector 202a and this signal is normally routed to a studio monitor in another room via connector 202b and one wanted to observe the HDTV signal, then one could plug patch cord connector 204a into port 104a, thereby diverting the optical signal into the optical fiber of patch cord connector 204a. Thus, by placing the other end of the optical fiber connected to connector 204a into a portable monitor, the optical signal would be routed to the front connector and appear on the portable monitor. At the same time, an alternative signal from another camera that is carried by the optical fiber of connector 204b could be inserted into the optical fiber of connector 202b by plugging connector 204b into port 104b. This is one example and there are many other reasons why patching may be desirable. Jack 100 may also be implemented with a monitor channel thus having two rear and three front ports.

Referring back to FIG. 1, jack 100 further includes: a reflector holder 105 for holding reflector 100, a jack housing 107, which, in the embodiment shown, includes a jack base 106 for receiving the reflector holder 105. Jack housing 107 may also include a jack cover (not shown in FIG. 1).

Jack Base 106

In the embodiment shown, jack base 106 contains four alignment means (e.g., grooves). Two rear alignment means 120a, 120b and two front alignment means 121a, 121b. Each of the rear alignment means 120 accepts an alignment sleeve of a fiber optic connector (see e.g., alignment sleeve 508 shown in FIG. 9) and aligns the optical axis of the first rear connector 202a with the optical axis of the second rear connector 202b, through the prism 110, forming a low loss connection between the two connectors. The front two alignment means 120 are arranged in proximity to the prism base such that inserting a connector into a front port (104a or 104b) causes the reflector holder 105 and reflector 110 to move out of the optical path between port 102a and 104a and the optical path between port 102b and 104b and cause the front connectors to be aligned to the rear connectors forming low loss connections between the two pairs of connectors. Removing the connector from the front panel will cause the prism and prism base to return to their previous position, again creating a low loss connection between the two rear connectors. The front and rear alignment means may be a V-groove machined into the base 106, a hole drilled in the base, a number of raised features inserted or machined into the base, or other method of optically aligning the connectors with the reflector and front and rear connectors.

Reflector 110

In some embodiments, reflector 110 is a prism, mirror or reflective coated material that will reflect the optical signal from a connector attached to one rear alignment to the other rear alignment means.

Reflector Holder 105

The reflector holder 105 holds the reflector 110 and allows the reflector to be moved out of the line of the optical beam and return to a position that is kinematically aligned such that the insertion loss is consistent between switching operations. The reflector holder 105 also allows alignment of the prism to the mechanical references using the optical axes during manufacture of the jack.

Figure 4:
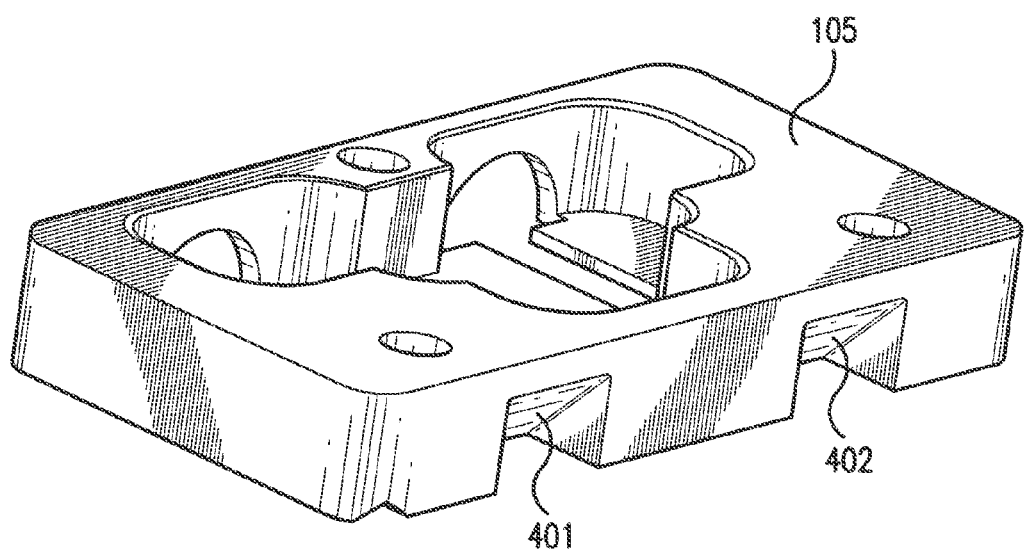
Figure 5:
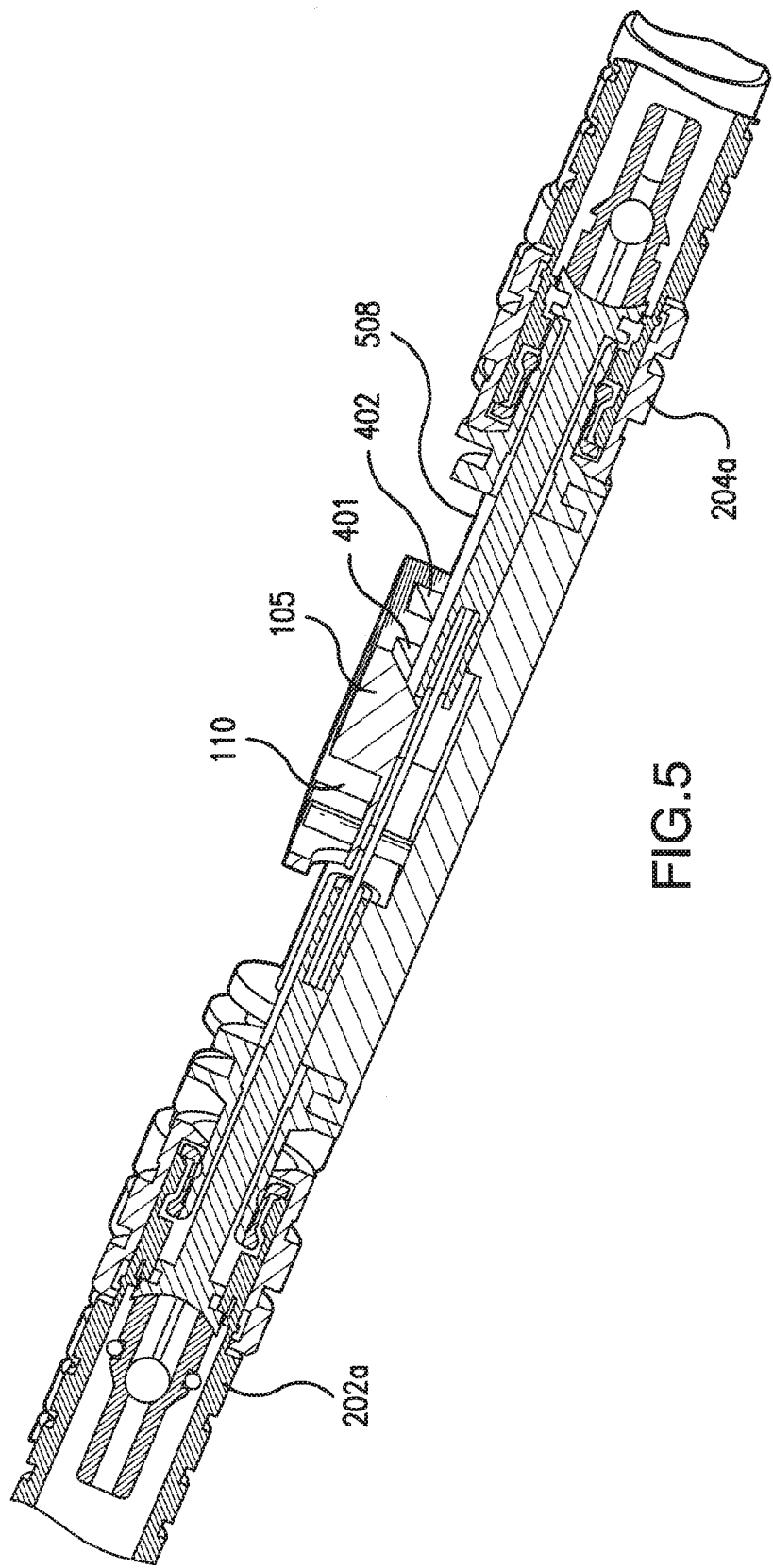

Referring back to FIG. 3, as shown in FIG. 3, when a counterpart fiber optic connector is inserted into port 104a or 104b by at least a certain amount, the insertion of the connector causes reflector holder 105 to automatically move reflector 110 so that there is a free optical path between ports 102a and 104a and between ports 102b and 204b. Referring now to FIG. 4, in some embodiments, holder 105 has two slanted surfaces 401 and 402 that face ports 104a and 104b, respectively. Jack 100 is configured such that when a connector (e.g., connector 204a) is inserted into port 104a or 104b by at least a certain amount, the front end 508 (a.k.a., alignment sleeve 508) of the connector 204a contacts holder 105 at slanted wall 401/402 and, because walls 401/402 are slanted, exerts an upward force on holder 105 causing holder 105 to automatically move upwardly relative to base 106. This feature is further shown in FIG. 5, which shows a cross-sectional view of jack 100 and connectors 202a, 204a. Referring back to FIG. 1, guide pins 130a-c guide holder 105 upward when a member presses against wall 401/402. That is, guide pins 130a-c prevent holder from moving in the directions of ports 102a and 102b when an object exerts a force in the direction of ports 102a and 102b on wall 401 or 402.

Figure 6:
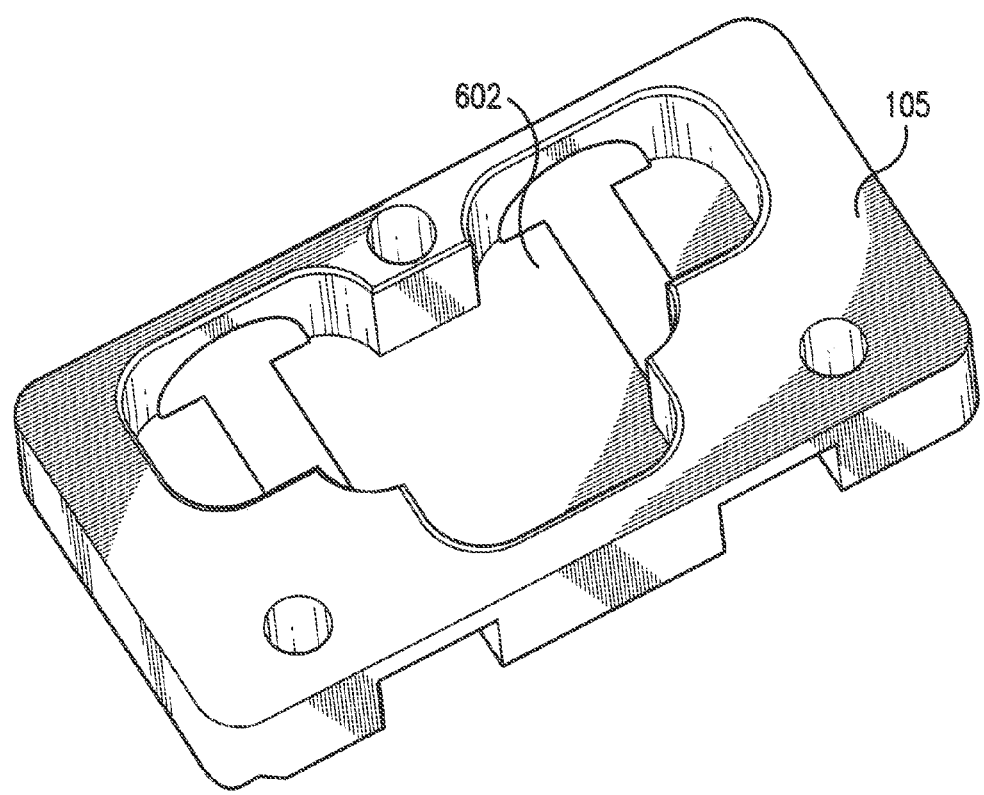

Referring now to FIG. 6, FIG. 6 further illustrates holder 105. As shown in FIG. 6, holder 105 has a floor 602 on which reflector 110 rests. Accordingly, when holder 105 moves upwardly due to a force on wall 401/402, the holder 105 carries the reflector 110 with it. This causes the reflector 110 to move such that it no longer receives the optical an optical signal injected into jack 100 via one of the ports 102a-104b.

Figure 7:
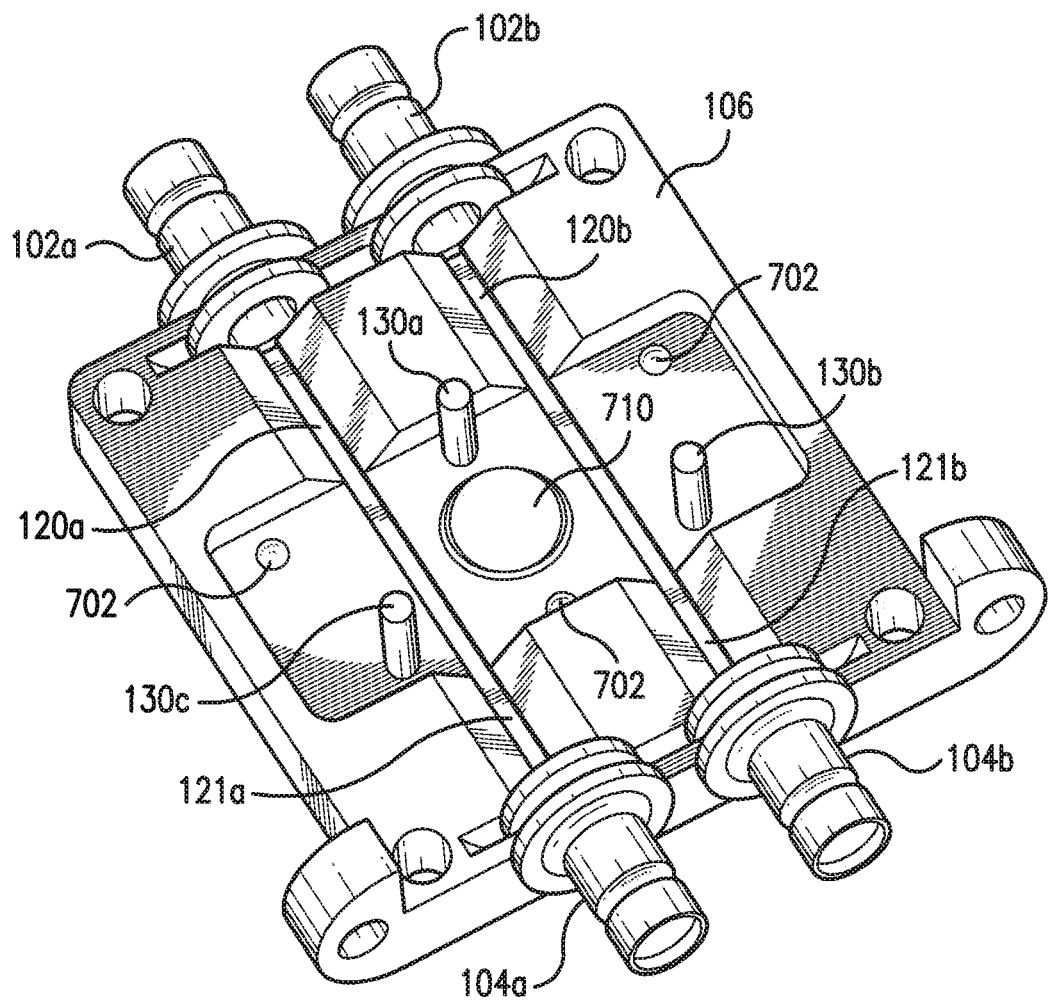
Figure 8:
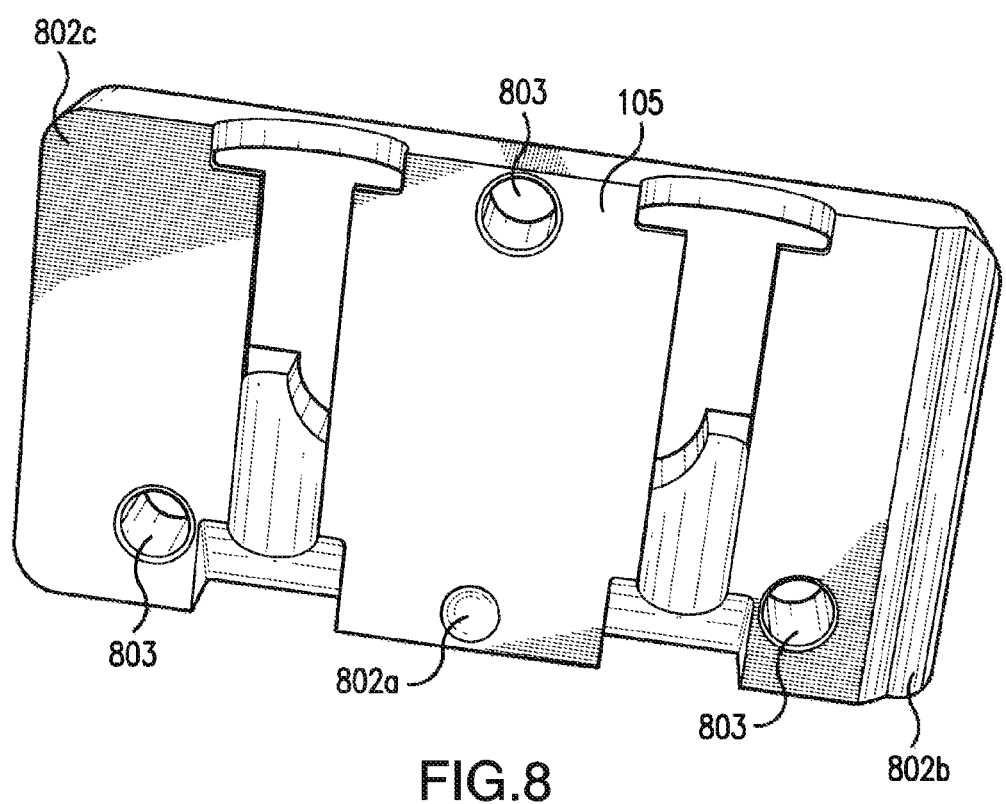

Referring now to FIG. 7, FIG. 7 further illustrates jack base 106 according to some embodiments. In the embodiment shown, base 106 includes one or more alignment balls 702 for aligning reflector holder 105 in the correct position with respect to jack base 106. In the embodiments where alignment balls 702 are used to align reflector holder 105 relative to jack base 106, reflector holder 105 includes one or more corresponding kinematic features 802 (e.g., a ball shaped indentation 802a, a V shaped groove 802b, and a planar feature 802c) (see FIG. 8, which shows a view of the bottom of reflector holder 105) for receiving an alignment ball 702.

As also shown in FIG. 7, jack base 106 may include an alignment magnet 710. Magnet 710 exerts a downward force on reflector holder 105 and, thus, serves to pull the reflector holder 105 onto the alignment balls in the normal position. In the non-normal position (i.e., the interrupt position), the magnet continues to apply some force such that when the connectors are removed from the front of the jack 100, the holder 105 settles back to precisely the same position, realigning the prism 110 in the loopback configuration. The magnet 710 could easily be replaced with or supplemented by a standard compression spring, inserted between a cover (not shown) that covers jack base 106 and the prism holder 105.

If the alignment rods 130 were replaced with rotary hinge mechanism, the rotary force would also create a spring force, eliminating the need for a spring or magnet. In the normal condition, the guide rods 130 do not touch or align the prism, this is done by the alignment balls. However in the interrupt actuated position, there is no need for any accurate alignment. The guide rods serve to loosely align the prism holder 105 vertically and ensure that when a connector is inserted into a front port (104a, 104b) the prism holder 105 is moved enough so that the prism does not block the path between port 102a and 104a or the path between port 102b and 104b. These alignment rods 130 could also be implemented as a hinge mechanism, secured to a rotary joint on the base 106 and guiding the prism holder 105 vertically using a loose rotary attachment on the prism holder.

Counterpart Fiber Optic Connectors

Figure 9:
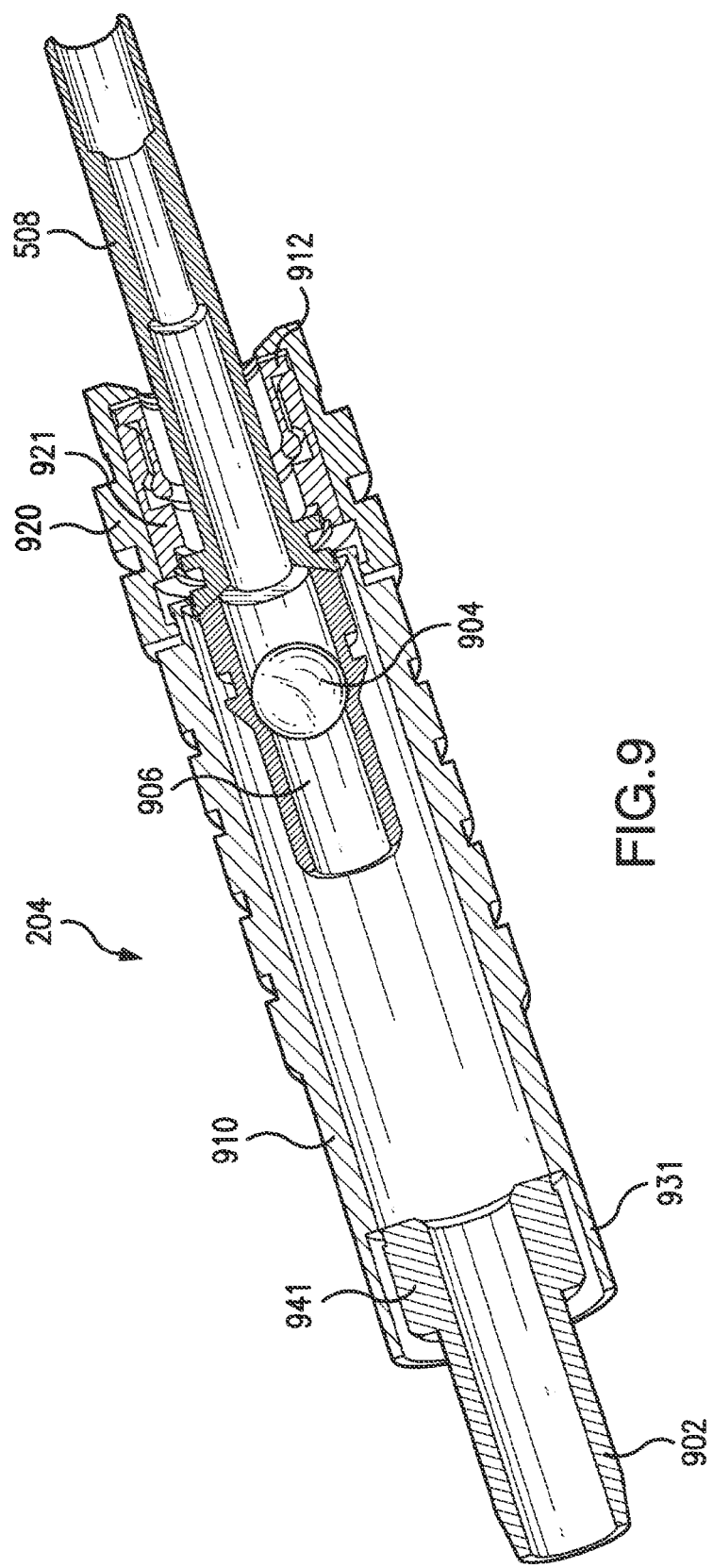
FIGS. 9-11 illustrate a fiber optic connector according to an embodiment of the invention.

Referring now to FIG. 9, FIG. 9 is a cross sectional view of a connector 204, according to some embodiments. As shown in FIG. 9, connector 204 includes: a rear alignment sleeve 902; a lens 904; a lens holder 906; a front alignment sleeve 508; and a housing 910. The lens holder 906 may include a cylindrical tube with a hole in the rear to accept an optical fiber or ferrule (see e.g., FIG. 12 element 1204) holding an optical fiber.

Figure 11:
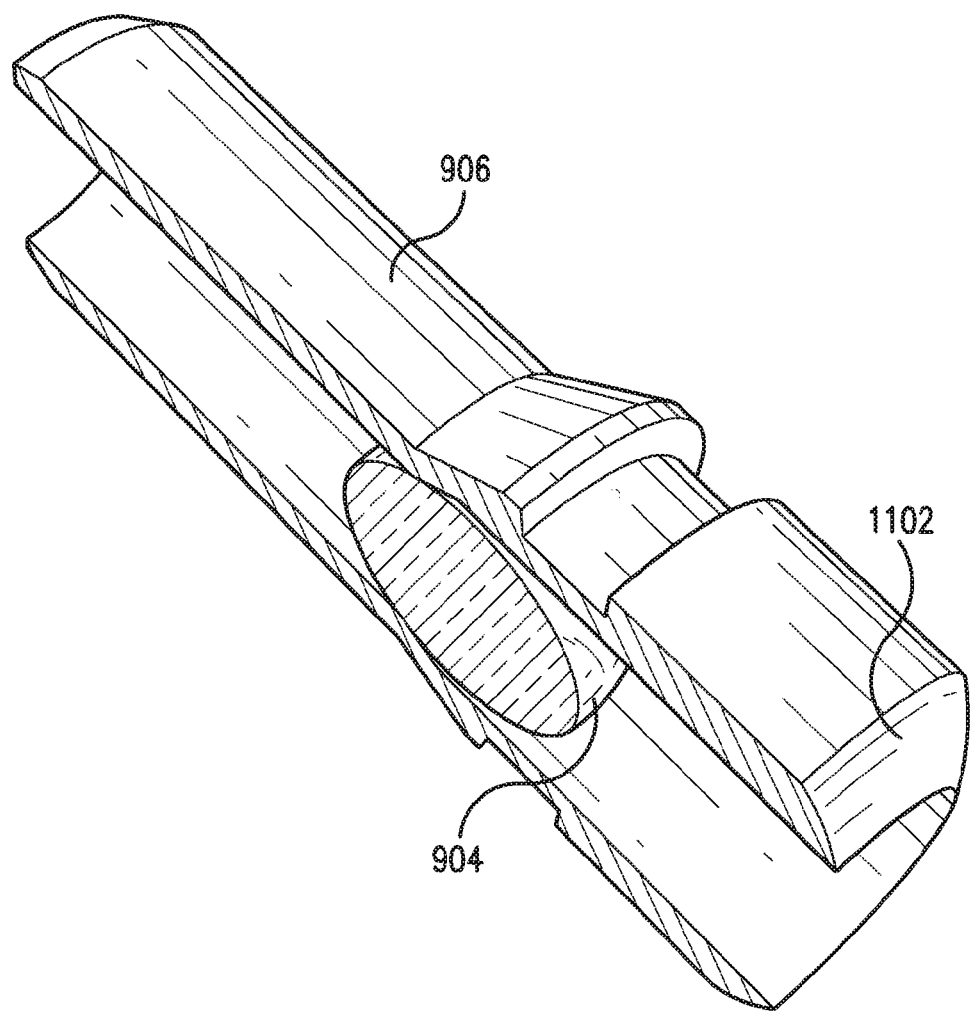

The lens holder 906 is configured to contain securely lens 904 and has a front section 1102b (see FIG. 11, which further shows holder 906) which is convex spherical with the center of the sphere located approximately at the front center of the lens. The lens 904 may be attached to the inside of the holder 906 using epoxy or other retention means such as a retaining ring.

Figure 10:
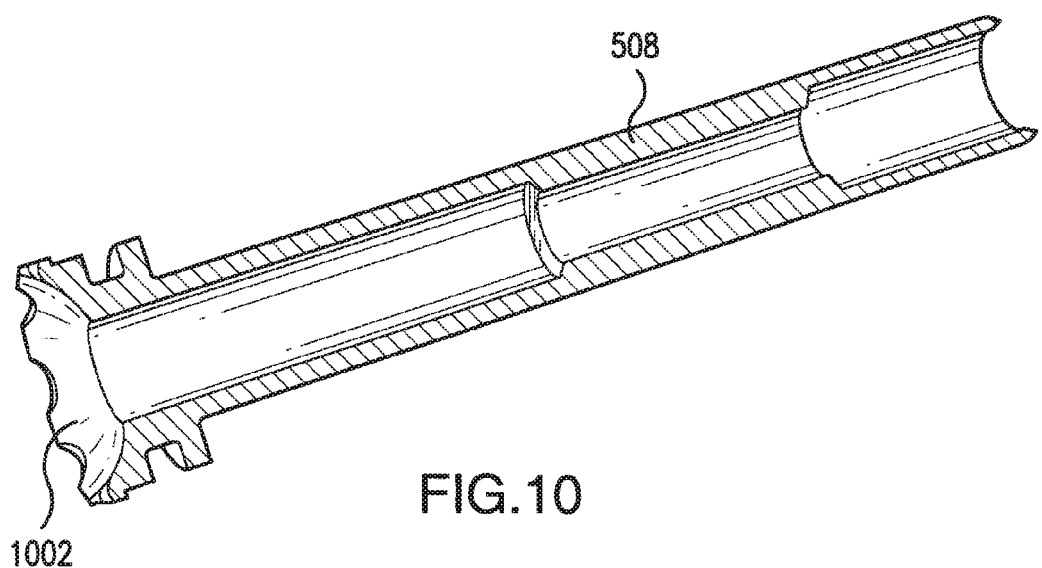

The front alignment sleeve 508 may be a cylindrical shaped tube with a concave spherical rear section 1002 (see FIG. 10, which further shows sleeve 508) that mates with the front section of the lens holder 906.

In use, in some embodiments, a fiber is attached in a ferrule using standard epoxy curing and fiber and ferrule polishing techniques to someone skilled in the art. The ferrule containing the fiber is inserted into the rear alignment sleeve 902, thus positioning the tip of the fiber so that it is placed at the focal point of the lens 904, substantially collimating light exiting from the fiber, or allowing collimated light entering the front of the lens to be focused into the fiber with minimal loss.

This alignment may be done by launching laser light into the fiber at the opposite end to the ferrule/rear alignment housing end. The launch is done through a 1×2 splitter to allow monitoring of the power returning into the fiber. The collimator is positioned in a fixture with the exit beam perpendicular to a gimbal mounted mirror which reflects the light back into the lens, where it is focused and enters the launch fiber. This light passes through the 1×2 fiber optic splitter to be detected by a power meter. The fiber ferrule located in the rear alignment sleeve is moved in the longitudinal direction to maximize the power returning into the power meter, thus indicating the point of best focus. At the point of best focus, ferrule/rear housing interface is bonded together. This bonding may be by crimping, tightening a screw, epoxied, or any mechanical bonding technique. Epoxy used may be UV cured, heat cured.

The front of the lens holder 906 is spherical and is placed into the rear of the front alignment sleeve 508. The interface substantially aligns the two axes (i.e., the two axes are coincident), the first being the optical axis of the assembly containing the rear alignment sleeve, lens, fiber and ferrule and the second being the mechanical centerline axis of the outside diameter of the front section of the front alignment sleeve. The two axes are aligned by supporting the outside diameter of the front section of the front alignment sleeve in a V groove pointing to a reference collimator, autocollimator or other means indicating when the optical beam is parallel to the V groove sides. The angle between the front and rear axes are adjusted using micropositioners attached to the rear housing assembly until the two axes are aligned.

Referring back to FIG. 9, housing 910 houses sleeves 902 and 508, lens 904 and lens holder 906. Housing 910 may be a cylindrical shaped tube. More specifically, a rear end portion 931 of housing surrounds a front portion 941 of sleeve 902. In some embodiments an outer ring 920 (a.k.a., release collar 920) surrounds a front end portion 921 of housing 910. Also, an inner ring 912 may be housed in the front end portion 921 of housing 910.

Figure 12:
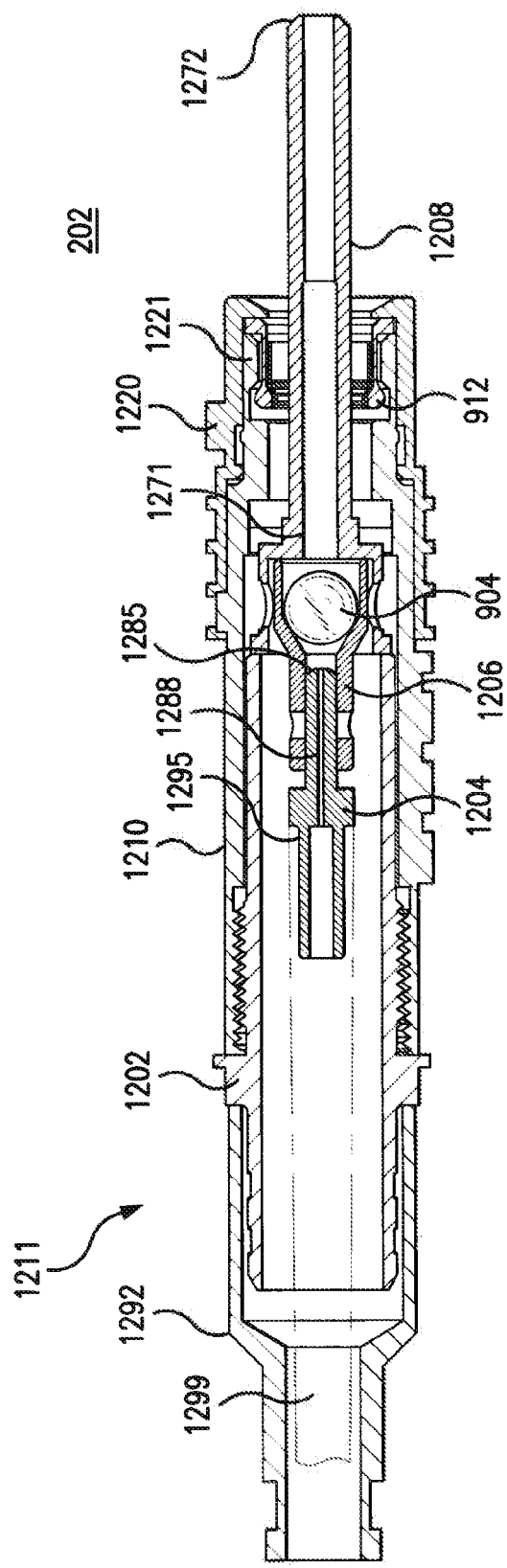
FIG. 12 illustrate a fiber optic connector according to another embodiment.

Referring now to FIG. 12, FIG. 12 illustrates an embodiment of fiber optic connector 202. This embodiment is similar to the embodiment of connector 204 shown in FIG. 9. Like the embodiment shown in FIG. 9, the embodiment shown in FIG. 12 includes an optical assembly that includes: lens 904; a lens holder 1206 in which the lens is disposed; and an optical fiber holder 1204 (e.g., a ferrule) attached to an end of an optical fiber 1299. The optical fiber holder 1204 is configured and positioned such that light exiting the end 1295 of the optical fiber will be received by the lens 904. As shown in FIG. 12, light exiting end 1295 of fiber 1299 will travel through a channel 1288 of holder 1204. The lens 904 is positioned and configured to collimate light exiting the end of optical fiber holder 1204 and received by the lens 904. For example, the tip 1285 of holder 1204 is positioned at the focal point of lens 904. The optical assembly has an optical axis along which the collimated light will travel. This optical axis is substantially coincident with the longitudinal access of channel 1288.

As further shown in FIG. 12, connector 202 includes an elongate hollow alignment sleeve 1208 having a centerline axis (a.k.a., longitudinal axis) extending from one end 1271 of the sleeve 1208 to the other end 1272 of the sleeve 1208. Sleeve 1208 is connected to the optical assembly so that lens 904 is positioned between the tip 1285 of optical fiber holder 1204 and end 1271 of alignment sleeve 1208. The centerline axis of the alignment sleeve 1208 is coincident with the optical axis of the optical assembly so that the collimated light will enter the hollow alignment sleeve at end 1271 and exit the sleeve at end 1272.

As further shown in FIG. 12, optical assembly may be housed in a housing 1211. As shown, housing 1211 may include an inner housing tube 1202, a front outer housing tube 1210, and a rear outer housing tube 1292. As shown, tube 1202 may have threads on an outer surface thereof that engage with threads formed on an inner surface of tube 1210, and rear tube 1292 surrounds a rear portion of tube 1202. Like the connector shown in FIG. 9, the connector shown in FIG. 12 may include lock ring 912, which may be retained in the front portion 1221 of tube 1210. Lock ring 912 is designed to engage with a retention groove of a counterpart connector (e.g., connector 102). A release collar 1220 may be positioned so that it surrounds front portion 1221 and contacts lock ring 912. Release collar 1220 functions to disengage lock ring from the retention groove of the counterpart connector.

Figure 13:
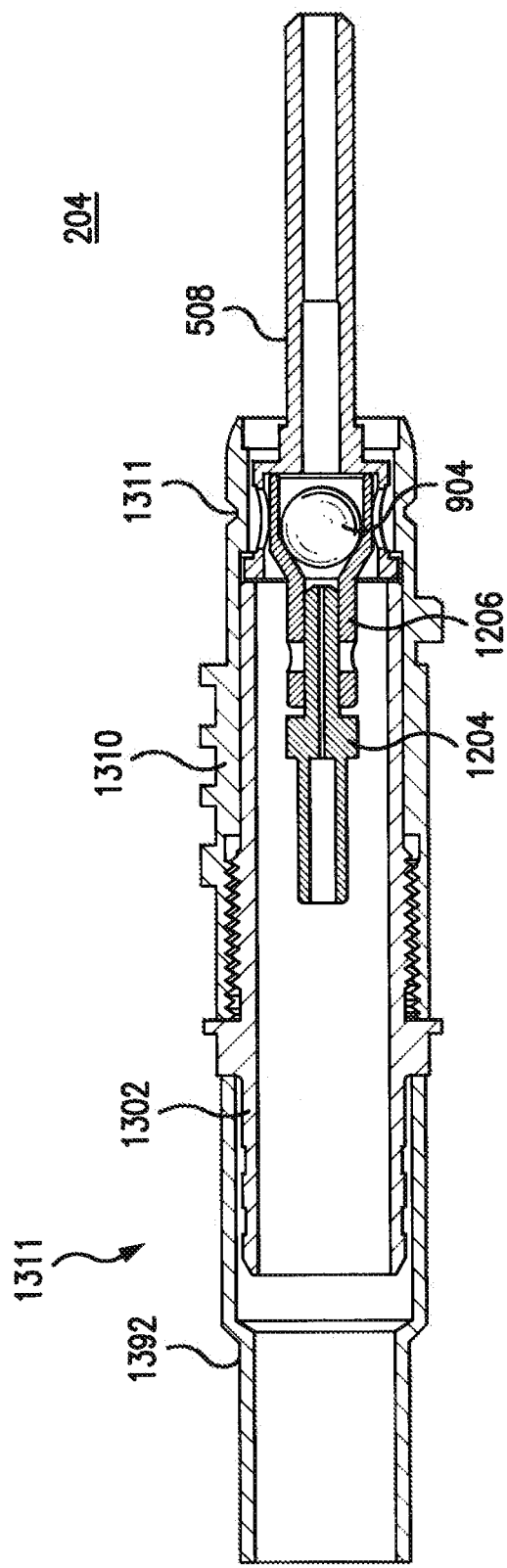
FIGS. 13-14 illustrate a fiber optic connector according to another embodiment of the invention.

Referring now to FIG. 13, FIG. 13 illustrates another embodiment of fiber optic connector 204. Fiber optic connector 204 shown in FIG. 13 is similar to connector 204 shown in FIG. 9 and connector 202 shown in FIG. 12, but connector 204 shown in FIG. 13 does not include the lock ring 912 or release collar 920. For example, in the embodiment shown, connector 204 includes the optical assembly of connector 202 and alignment sleeve 508, and includes a housing 1311 that includes an inner housing tube 1602, a front outer housing tube 1310, and a rear outer housing tube 1392. As shown, tube 1602 may have threads on an outer surface thereof that engage with threads formed on an inner surface of tube 1310, and rear tube 1392 surrounds a rear portion of tube 1602. Front outer housing 1310 differs from front outer housing 1210 in that housing 1310 includes a retention groove 1311 formed in a front portion 1321 of housing 1310 for receiving a retention spring of a counterpart connector (e.g., connector 104).

Figure 14:
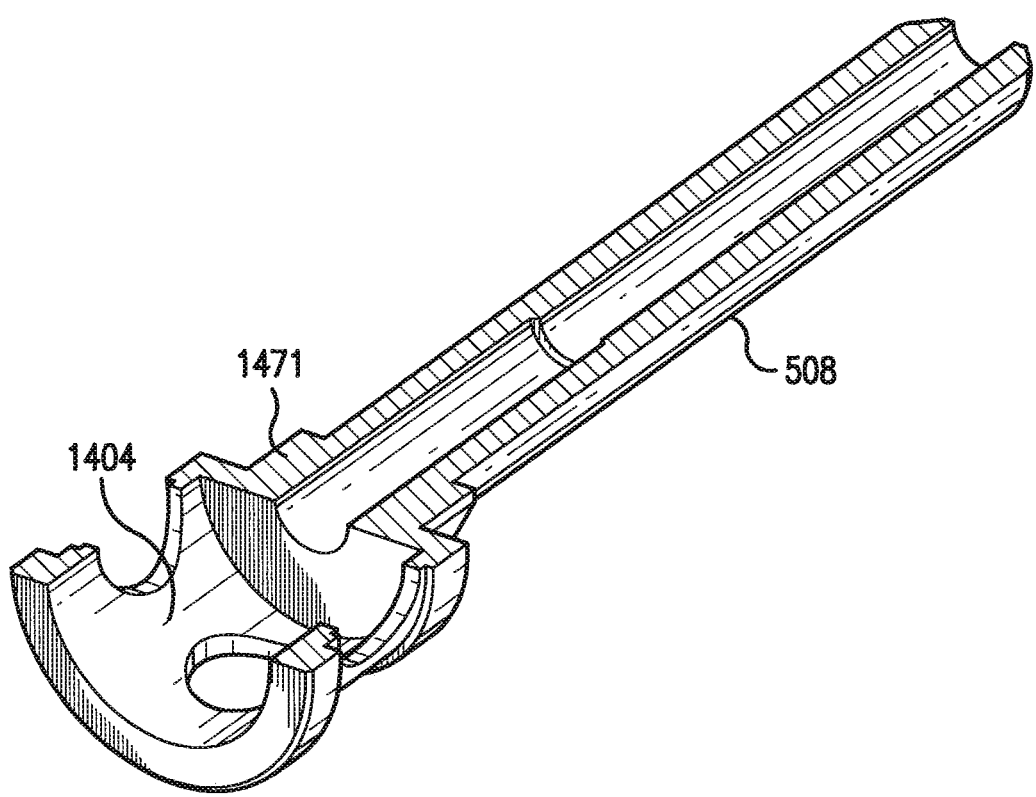

Referring now to FIG. 14, FIG. 14 further illustrates an embodiment of alignment sleeve 508. As shown in FIG. 14 a ring 1402 is connected to an end 1471 of the alignment sleeve. Ring 1402 may be integrally connected to sleeve 508. Ring 1402 and sleeve 508 form a cavity 1404. As shown in FIG. 13, the portion of lens holder 1206 in which lens 904 is disposed is positioned in the cavity 1404. In some embodiments, sleeve 508 has a length between about 1 and 2 inches and its outer diameter ranges between about 0.04 and 0.12 inches. In some embodiments, sleeve 1208 is identical to sleeve 508.

Figure 15:
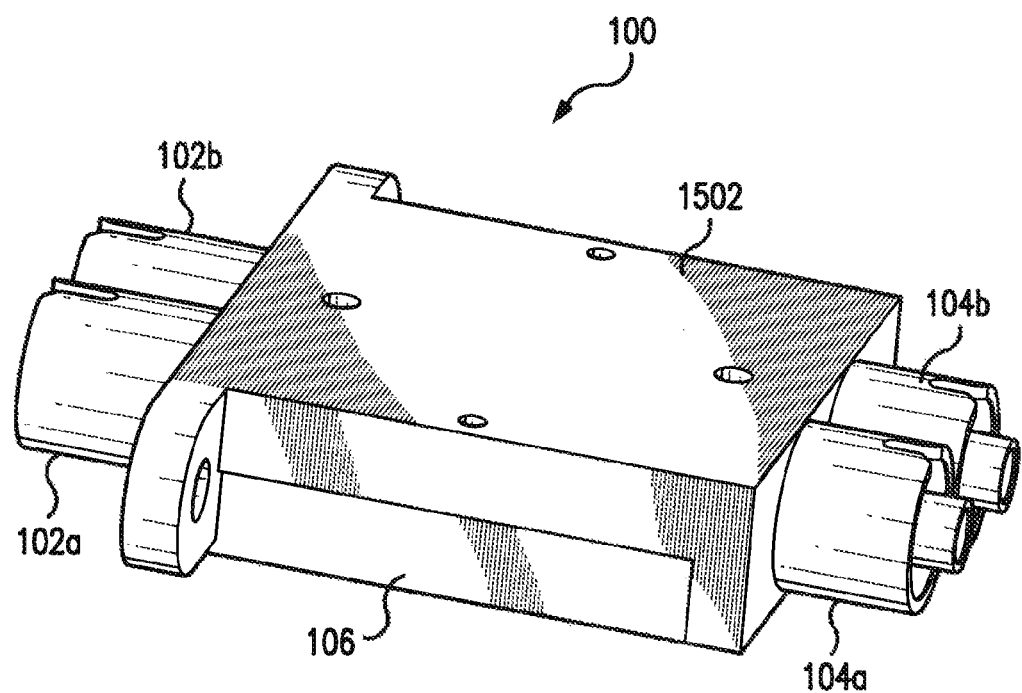
FIGS. 15-25 further illustrate a fiber optic jack according to embodiments of the invention.

Referring now to FIG. 15, FIG. 15 illustrates jack 100 with a low-profile cover 1502 installed. Low profile cover 1502 functions to enclose the reflector 110, reflector holder 105, and other components of the jack 100. In the embodiment shown, cover 1502 also serves as an attachment point for the rear ports 102 and front ports 104, which each have a portion that passes through an aperture in a rear end and front end of the cover, respectively. The cover 1502 may be attached to the jack base 106 by screws and held in place by alignment pins.

Figure 16:
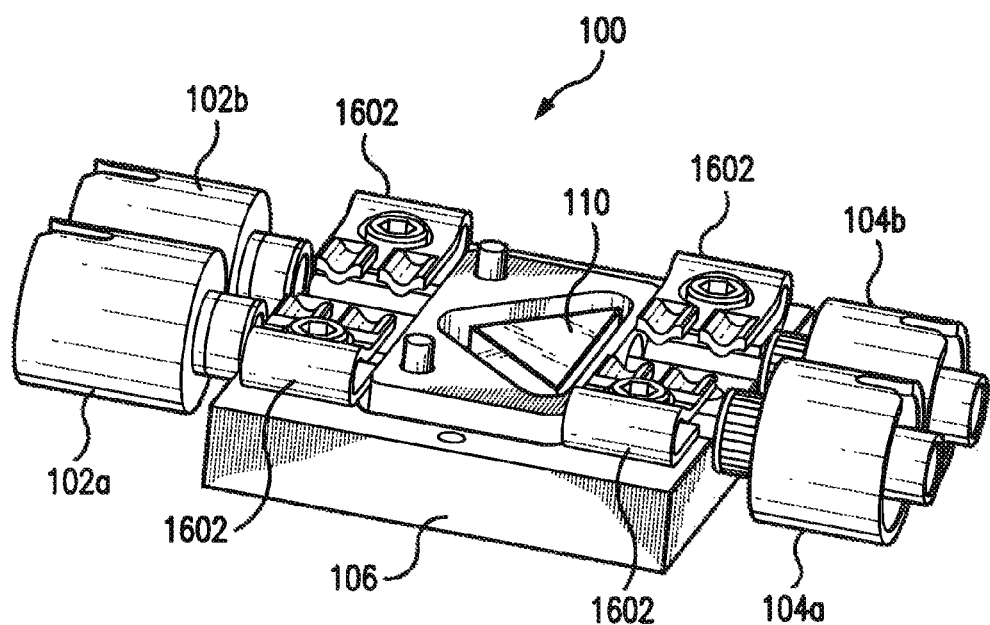
Figure 17:
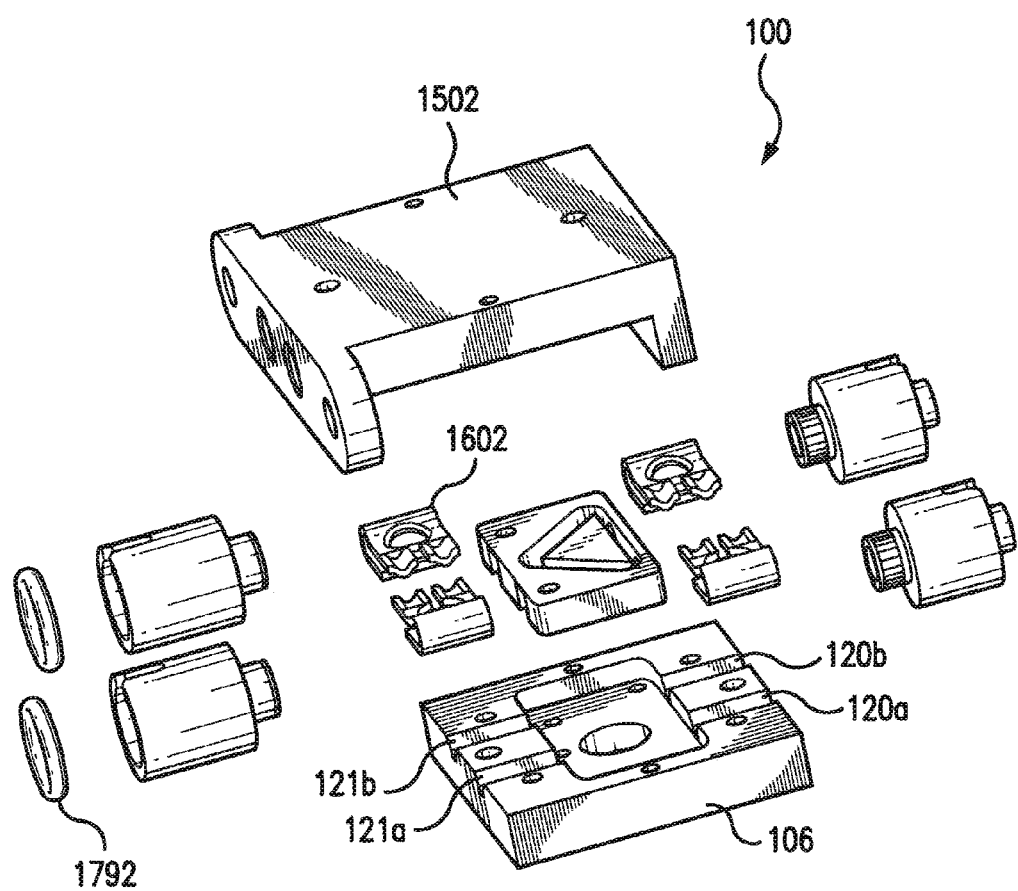

Referring now to FIGS. 16 and 17, FIGS. 16 and 17 illustrate that jack 100 may further include one or more retention clips 1602. Each retention clip being positioned adjacent a rear port 102 or front port 104. Each retention clip is designed to press a front portion of a fiber optic connector to base 106. For example, when a user mates fiber optic connector 202 with port 102a the front alignment sleeve 508,1208 of the fiber optic connector 202 passes through the port and into the jack base 106, and the clip 1602 positioned adjacent port 102a will exert on connector 202's alignment sleeve 508,1208 a force in the direction of base 106 (i.e., a downward force), thereby securing the alignment sleeve and assuring that the alignment sleeve will be aligned correctly within jack 100.

Figure 18:
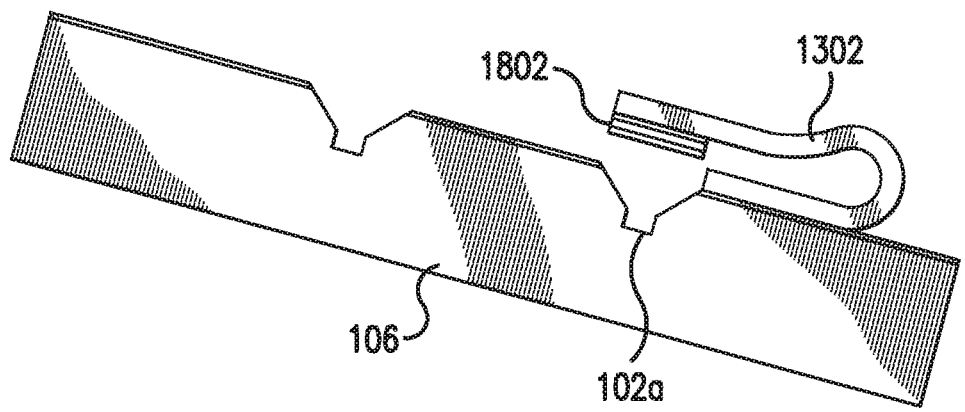

Referring now to FIG. 18, FIG. 18 shows a side view of an exemplary retention clip 1602. As shown, a portion 1802 of the retention clip distal to the point of attachment of clip 1602 to the jack base 106 is positioned directly above groove 102a. The retention clips 1602 are sized and positioned such that the distance between portion 1502 and the bottom of the side walls of groove 120a is slightly less than the diameter of a front alignment sleeve 508, 1208. When a front alignment sleeve 508, 1208 is inserted into groove 120a via port 102a the sleeve will contact the retention clip 1602 and push it upwardly. The retention clip exerts a corresponding downward force which holds the front alignment sleeve firmly in place in the groove but still allows for the fiber optic connector to be removed from the port.

Figure 19:
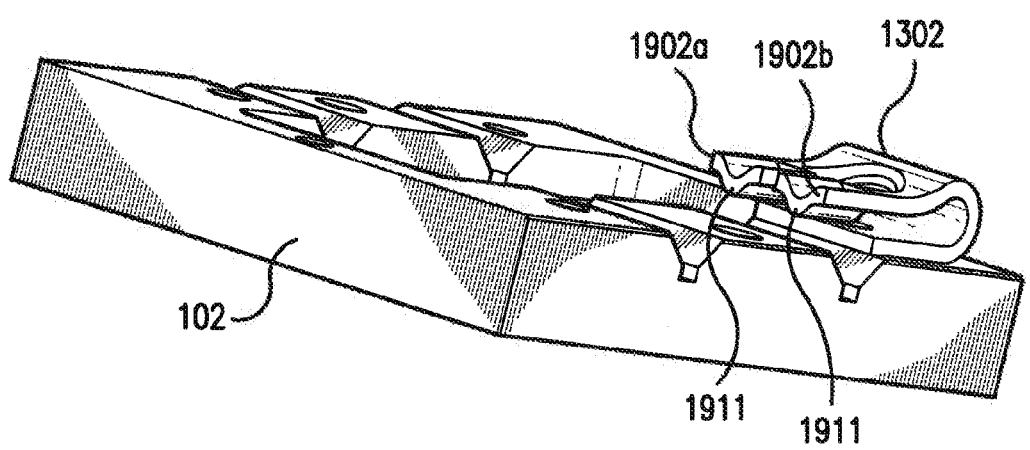

Referring now to FIG. 19, FIG. 19 further illustrates jack 100 according to some embodiments. In the embodiment shown, the retention clips are structured with two tabs 1902a,b at the distal end of the retention clip 1602. In the embodiment shown, the bottom surface of each tab (i.e., the surface that faces groove 120a) has protuberance 1911 that extends in the direction of the groove. Accordingly, it is this protuberance 1911 that the alignment sleeve 508, 1208 will contact when the alignment sleeve is inserted into the groove 120a.

Figure 20:
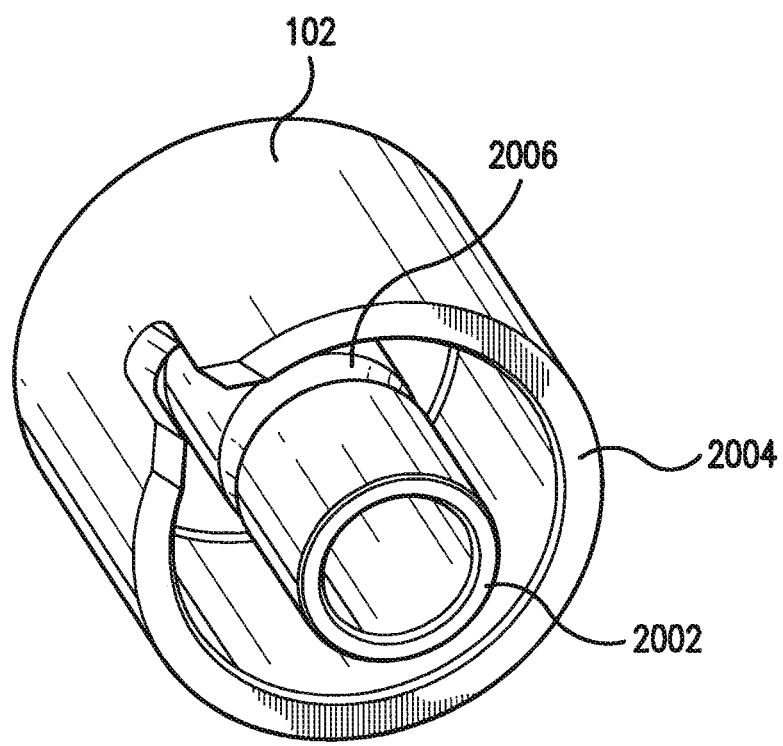
Figure 21:
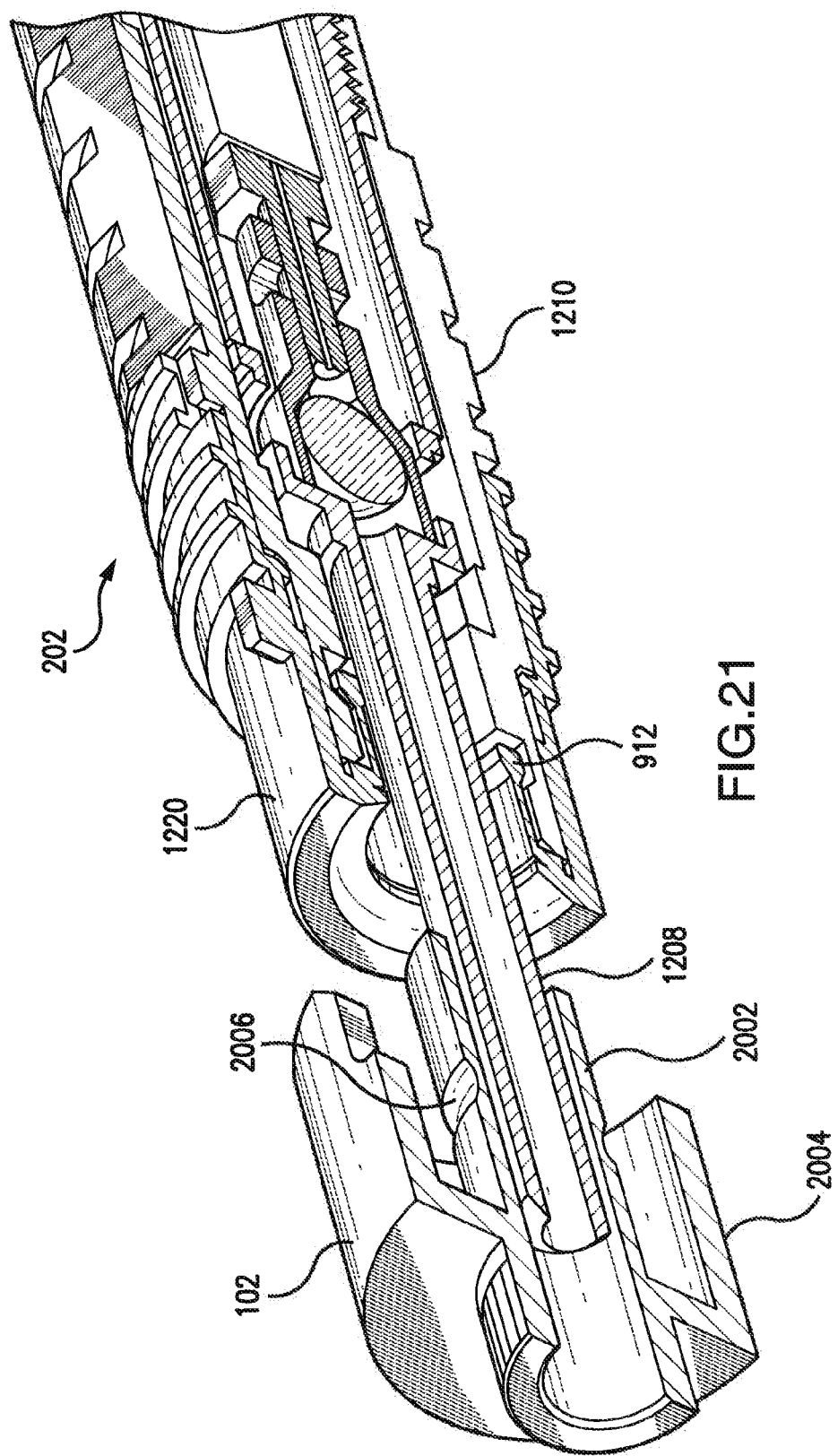
Figure 22:
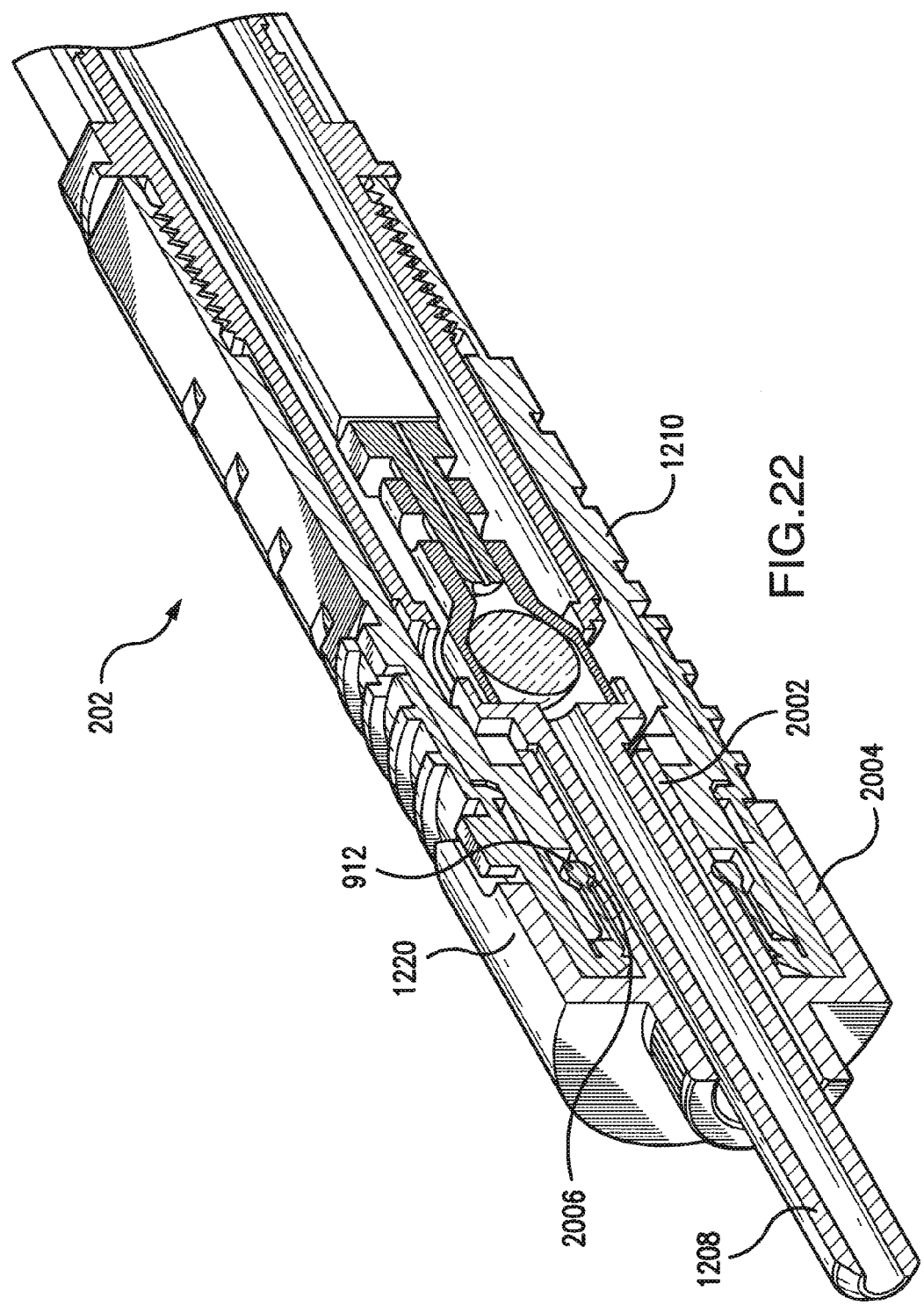

Referring now to FIG. 20, FIG. 20 shows a detail view of an embodiment of a rear port 102. This embodiment of a rear port is comprised of an inner attachment cylinder 2002 and an outer shroud 2004. The inner attachment cylinder 2002 is configured to accept the front alignment sleeve 1208 of connector 202. The inner attachment cylinder 2002 is configured with a retention groove 2006 around the circumference of the cylinder which engages with lock ring 912 of connector 202 when connector 202 is mated with port 102. FIG. 21 shows a sectional view of an embodiment of a rear port 102 and a connector 202. This view shows the connector 202 as it is being inserted into rear port 102. As the connector 202 is connected to rear port 102, the front alignment sleeve 1208 is inserted into the inner attachment cylinder 2002. Lock ring 912 is not engaged in retention groove 2006 and the connector slides freely into or out of the rear port 102. FIG. 22 shows a sectional view of an embodiment of a rear port 102 and connector 202 with the connector 202 fully inserted to the rear port 102. Lock ring 912 is fully engaged in retention groove 2006 firmly holding connector 202 in place on rear port 102. A user may de-mate connector 202 from port 102 by gripping outer ring 1220 and pulling the connector away from the port. This action causes lock ring 912 to disengage from the retention groove.

Figure 23:
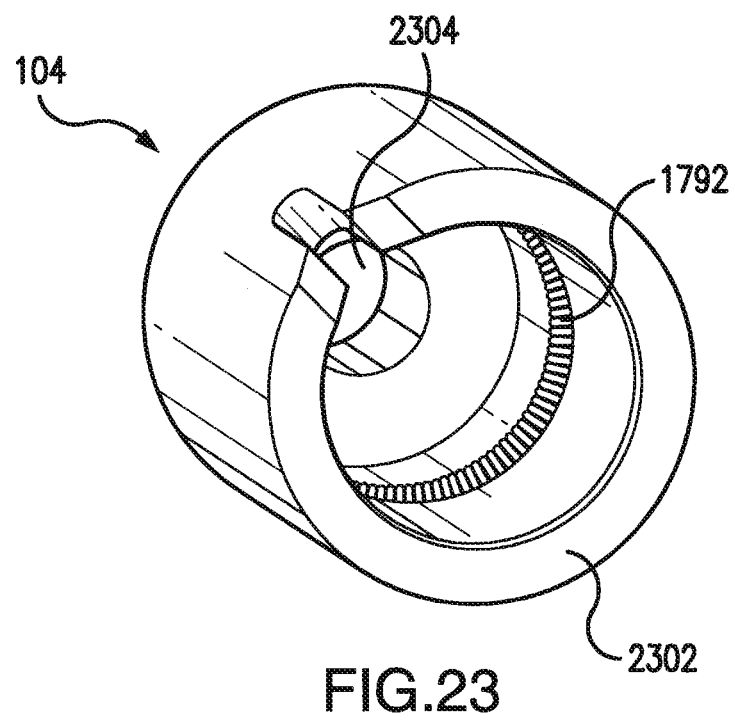
Figure 24:
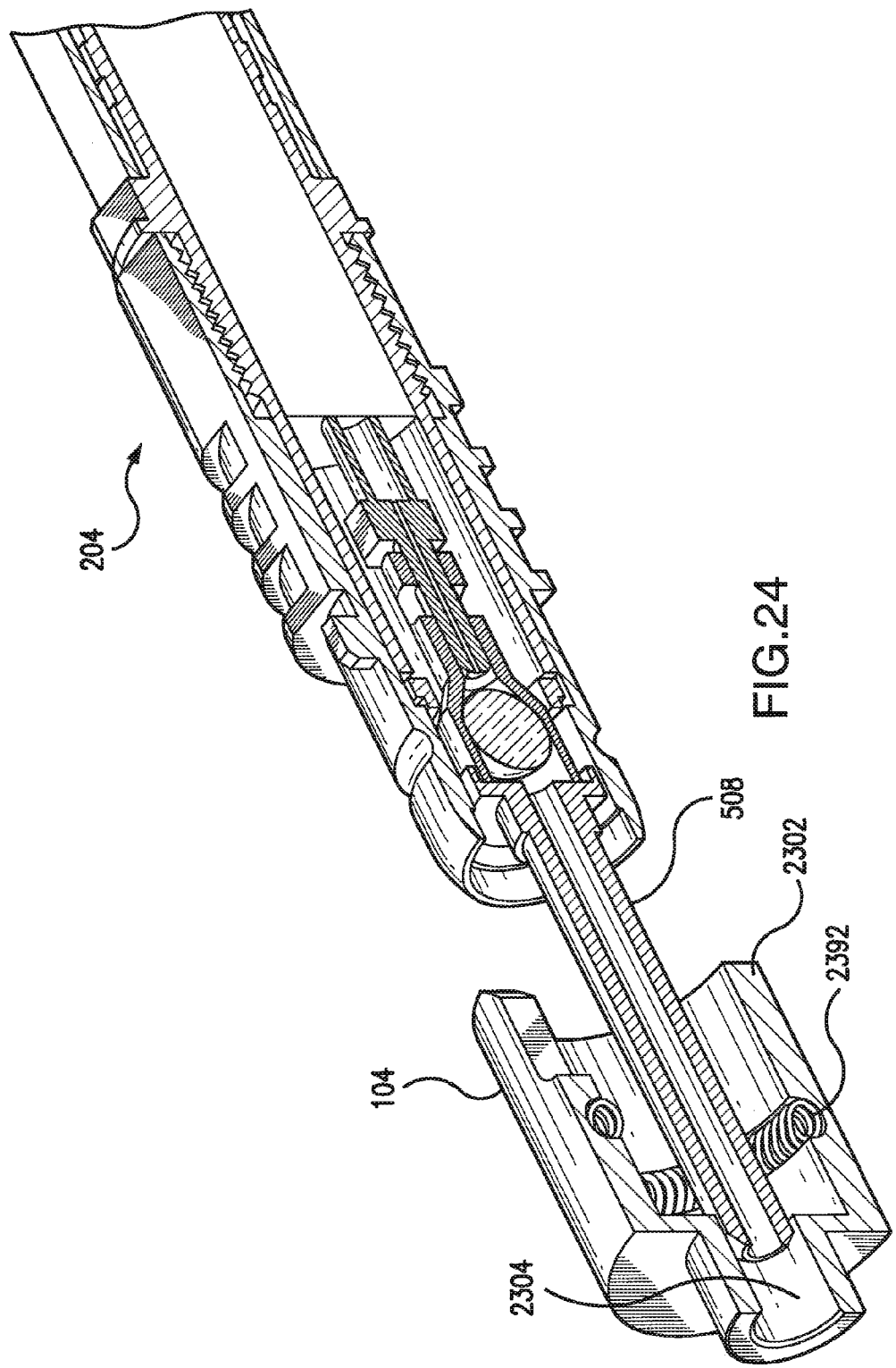
Figure 25:
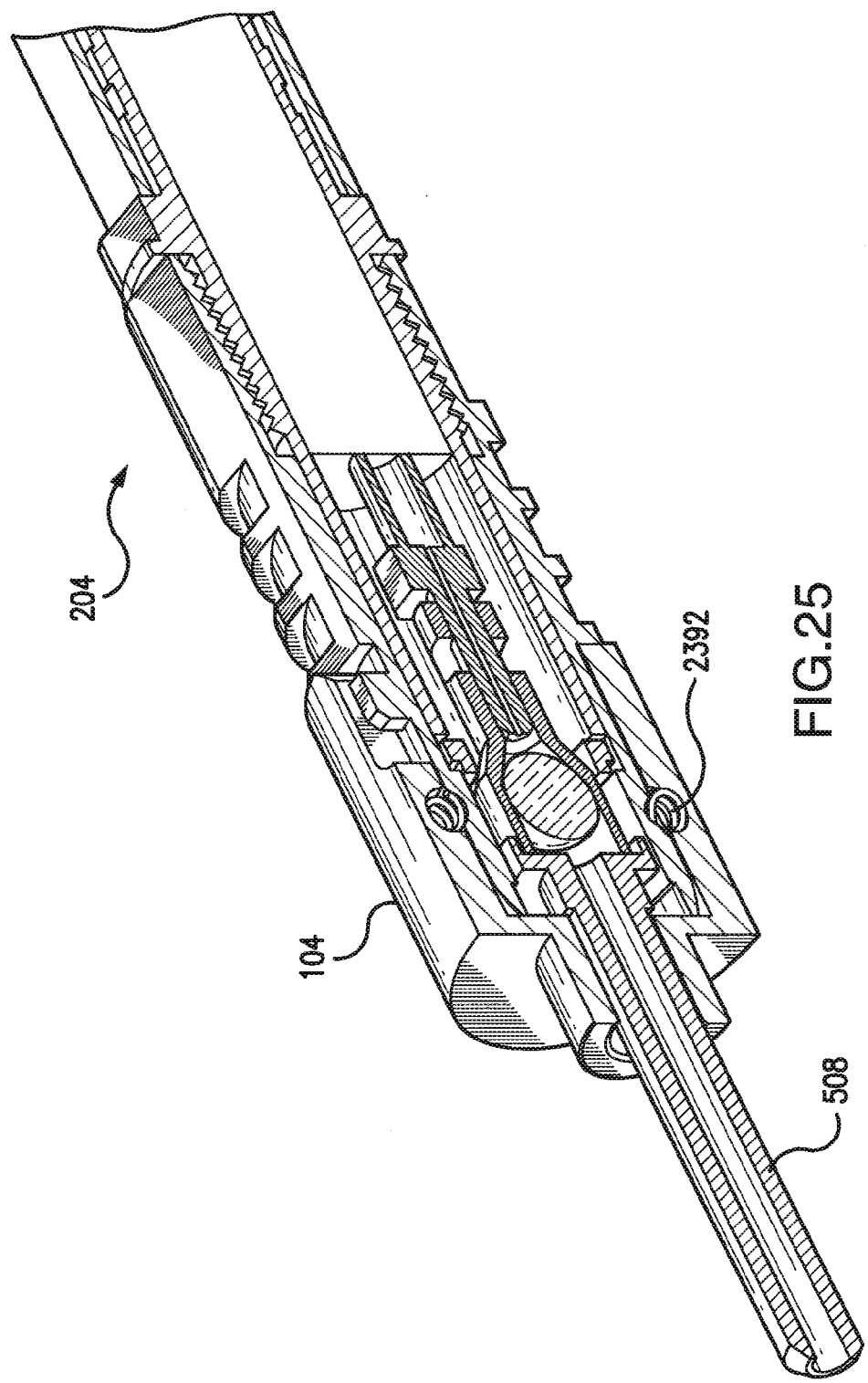

Referring now to FIG. 23, FIG. 23 shows a detail view of an embodiment of a front port 104. This embodiment of a front port is comprised of an outer shroud 2302 and includes a pass through hole 2304 on the closed, flat end of the port. The outer shroud 2302 has a groove formed in the inner wall of shroud 2302 in which groove a retention spring 1792 is seated. FIG. 24 shows a sectional view of an embodiment of a front port 104 and connector 204. This view illustrates the connector 204 as it is being mated with front port 104. When the connector 204 is being mated with front port 104 the front alignment sleeve 508 passes through the pass through hole 2304. FIG. 25 shows a sectional view of an embodiment of a front port 104 and connector 204 with the connector 204 mated with front port 104. Once the connector 204 is mated with front port 104, the retention spring 1792 engages with groove 1311 of connector 204 and exerts an inward radial force on housing 1310 because the inner diameter of spring 1792 is less than the outer diameter of portion 1321 of housing 1310. This force is sufficient to prevent the connector 204 from accidentally being demated from front port 104, but still allows the cable to be removed without requiring operating of a release collar or similar mechanism.

While various embodiments of the present invention have been described above, it should be understood that they have been presented by way of example only, and not limitation. Thus, the breadth and scope of the present invention should not be limited by any of the above-described exemplary embodiments.

The invention claimed is:

1. A fiber optic connector, comprising:
    an optical assembly comprising:
        a lens;
        a lens holder in which the lens is disposed; and
        an optical fiber holder holding an end of an optical fiber, the optical fiber holder being configured and positioned such that light exiting the end of the optical fiber will be received by the lens, wherein
        the lens is positioned and configured to substantially collimate light exiting the optical fiber held by the optical fiber holder, and
        the optical assembly has an optical axis along which the substantially collimated light will travel; and
    an elongate hollow alignment sleeve having a centerline axis extending from a rear end of the sleeve to a front end of the sleeve, wherein
    the lens is positioned between the end of the optical fiber and the rear end of the alignment sleeve,
    the centerline axis of the alignment sleeve is substantially parallel with the optical axis of the optical assembly so that the substantially collimated light will enter the hollow alignment sleeve at the rear end and exit the hollow alignment sleeve at the front end, and
    the alignment sleeve is substantially undeformable.

2. The fiber optic connector of claim 1, wherein the optical fiber holder is integrally part of the lens holder.

3. The fiber optic connector of claim 1, wherein the optical fiber holder is a ferrule having a first portion housed within a cavity formed by an end portion of the lens holder and having a second portion defining a cavity for receiving an end of an optical fiber, wherein the first portion has a free optical path that connects the cavity with a hole in the tip of the first portion of the ferrule.

4. The fiber optic connector of claim 3, wherein the diameter of the free optical path is substantially less than the diameter of the cavity.

5. The fiber optic connector of claim 3, wherein a front end of the first portion of the ferrule is located at a focal point of the lens so that the lens will collimate the light exiting the front end of the first portion of the ferrule.

6. The fiber optic connector of claim 3, wherein the lens is a ball lens.

7. The fiber optic connector of claim 1, wherein the lens is a ball lens.

8. The fiber optic connector of claim 1, wherein the length of the alignment sleeve is substantially greater than the width of the alignment sleeve.

* * * * *